United States Patent
Leiber et al.

(10) Patent No.: US 11,458,943 B2
(45) Date of Patent: Oct. 4, 2022

(54) BRAKE DEVICE, IN PARTICULAR FOR ELECTRICALLY DRIVEN MOTOR VEHICLES

(71) Applicant: LSP Innovative Automotive Systems GmbH, Unterföhring (DE)

(72) Inventors: Thomas Leiber, Rogoznica (HR); Christian Köglsperger, Geretsried (DE); Valentin Unterfrauner, Munich (DE); Rainer Winzer, Munich (DE); Christoph Prüll, Munich (DE)

(73) Assignee: LSP INNOVATIVE AUTOMOTIVE SYSTEMS GMBH, Unterfohring (DE)

( * ) Notice: Subject to any disclaimer, the term of this patent is extended or adjusted under 35 U.S.C. 154(b) by 0 days.

(21) Appl. No.: 16/615,547

(22) PCT Filed: May 22, 2018

(86) PCT No.: PCT/EP2018/063274
§ 371 (c)(1),
(2) Date: Nov. 21, 2019

(87) PCT Pub. No.: WO2018/215397
PCT Pub. Date: Nov. 29, 2018

(65) Prior Publication Data
US 2020/0216047 A1 Jul. 9, 2020

(30) Foreign Application Priority Data
May 22, 2017 (DE) ...................... 10 2017 111 077.1

(51) Int. Cl.
*B60T 13/74* (2006.01)
*B60T 8/40* (2006.01)
(Continued)

(52) U.S. Cl.
CPC ............ *B60T 8/4081* (2013.01); *B60T 7/042* (2013.01); *B60T 8/267* (2013.01); *B60T 13/146* (2013.01);
(Continued)

(58) Field of Classification Search
CPC ...... B60T 13/745; B60T 8/4081; B60T 8/409; B60T 13/586; B60T 8/368; B60T 8/3685; B60T 2270/60; B60T 2270/604
See application file for complete search history.

(56) References Cited

U.S. PATENT DOCUMENTS 5,318,355 A    6/1994 Asanuma et al.
5,511,859 A  * 4/1996 Kade ..................... B60K 6/442
                                                         303/3

(Continued)

FOREIGN PATENT DOCUMENTS

DE    4124496      1/1993
DE    4327206 A1   2/1995
(Continued)

OTHER PUBLICATIONS

Machine translation of WO 9505299, retrieved Apr. 24, 2021 (Year: 2021).*

(Continued)

*Primary Examiner* — Bradley T King
(74) *Attorney, Agent, or Firm* — Panitch Schwarze Belisario & Nadel LLP

(57) ABSTRACT

A brake apparatus, for electrically driven motor vehicles, includes a traction motor at an axle of a vehicle, which traction motor is used both as drive motor and as brake system with recuperation of brake energy, a first piston-cylinder unit, which is actuatable by means of an actuating device, in particular brake pedal, a second piston-cylinder unit, which is actuatable by means of an electromotive drive (Continued)

Figures 1A, 1B:
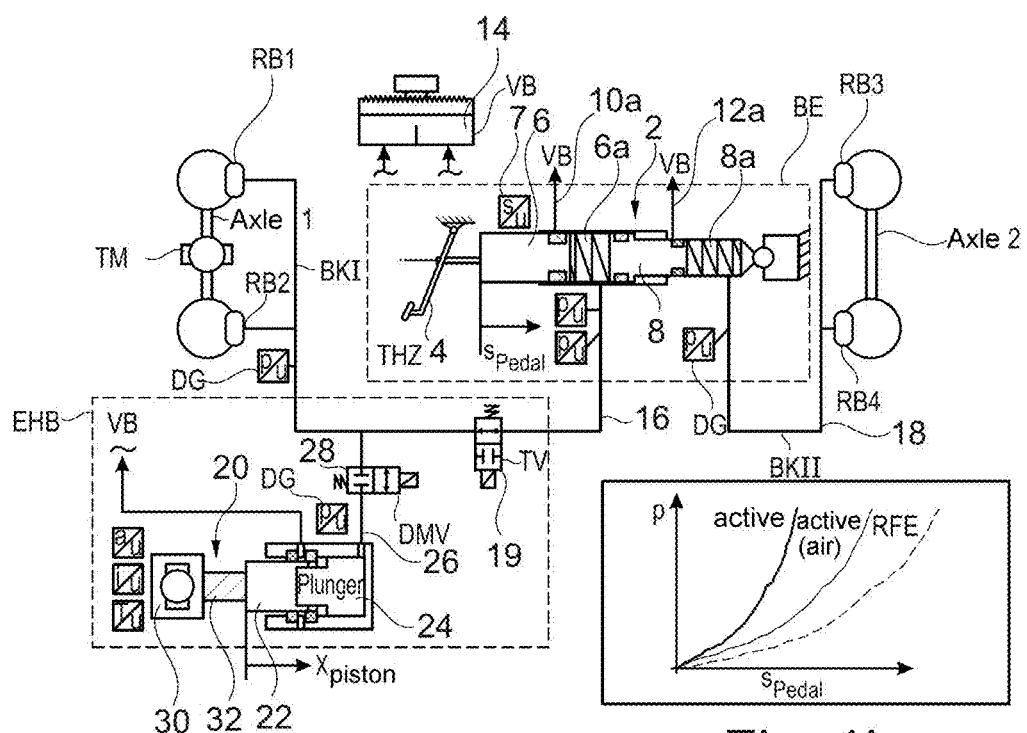

and a non-hydraulic gearing apparatus, in particular spindle drive. The piston-cylinder units are connected via hydraulic connecting lines to wheel brakes of the motor vehicle. A pressure chamber of the first piston-cylinder unit is connected to two wheel brakes of a vehicle axle, and a pressure chamber of the second piston-cylinder unit is connected to a vehicle axle for active brake force feedback control and recuperation control in interaction with the traction motor.

34 Claims, 8 Drawing Sheets

(51) Int. Cl.
*B60T 7/04* (2006.01)
*B60T 8/26* (2006.01)
*B60T 13/14* (2006.01)
*B60T 13/66* (2006.01)
*B60T 13/68* (2006.01)

(52) U.S. Cl.
CPC ........... *B60T 13/662* (2013.01); *B60T 13/686* (2013.01); *B60T 2220/04* (2013.01); *B60T 2270/604* (2013.01)

(56) References Cited

U.S. PATENT DOCUMENTS

| | | | |
|---|---|---|---|
| 5,588,716 A * | 12/1996 | Stumpe | B60T 7/20 303/7 |
| 8,851,579 B2 | 10/2014 | Ohkubo et al. | |
| 2001/0039230 A1* | 11/2001 | Severinsky | B60T 7/06 180/65.23 |
| 2004/0054450 A1 | 3/2004 | Nakamura et al. | |
| 2005/0017577 A1* | 1/2005 | Eckert | B60T 13/683 303/123 |
| 2007/0228821 A1 | 10/2007 | Maki et al. | |
| 2008/0100129 A1* | 5/2008 | Lubbers | B60L 7/18 303/113.1 |
| 2009/0115242 A1* | 5/2009 | Ohtani | B60T 13/745 303/3 |
| 2011/0241419 A1 | 10/2011 | Ohkubo et al. | |
| 2011/0285200 A1* | 11/2011 | Hatano | B60T 13/686 303/6.01 |
| 2012/0139330 A1 | 6/2012 | Morishita | |
| 2013/0134768 A1* | 5/2013 | Ito | B60T 13/745 303/3 |
| 2013/0234501 A1* | 9/2013 | Leiber | B60T 8/4018 303/10 |
| 2014/0008965 A1* | 1/2014 | Ito | B60T 13/58 303/3 |
| 2015/0115697 A1* | 4/2015 | Yamamoto | B60T 13/588 303/3 |
| 2016/0016571 A1* | 1/2016 | Ganzel | B60T 7/042 303/66 |
| 2016/0039401 A1* | 2/2016 | Shimada | B60T 8/4081 303/114.1 |
| 2017/0057481 A1* | 3/2017 | Schumann | B60T 13/686 |
| 2018/0079313 A1* | 3/2018 | Foitzik | B60T 13/741 |
| 2018/0134261 A1* | 5/2018 | Akita | B60L 7/26 |
| 2018/0215366 A1* | 8/2018 | Leiber | B60T 13/686 |
| 2018/0222460 A1* | 8/2018 | Owen | B60W 30/18109 |
| 2018/0257622 A1* | 9/2018 | Saito | B60T 13/20 |
| 2018/0290640 A1* | 10/2018 | Johnson | B60T 13/662 |
| 2020/0164845 A1* | 5/2020 | Yukoku | B60T 8/30 |

FOREIGN PATENT DOCUMENTS

| | | |
|---|---|---|
| DE | 102005055751 A1 | 11/2006 |
| DE | 102007043592 A1 | 5/2008 |
| DE | 102010042995 A1 | 5/2012 |
| DE | 102012002791 A1 | 8/2013 |
| DE | 102013203172 A1 | 9/2013 |
| DE | 102013224783 A1 | 6/2015 |
| DE | 202015008975 U1 | 6/2016 |
| DE | 202015008976 U1 | 7/2016 |
| DE | 102015103860 A1 | 9/2016 |
| DE | 102015204866 A1 | 9/2016 |
| EP | 1907253 B1 | 7/2013 |
| GB | 2543636 A | 4/2017 |
| WO | 95/05299 A1 | 2/1995 |
| WO | 2011141158 A2 | 11/2011 |
| WO | 2013156391 A1 | 10/2013 |
| WO | 2015016302 A1 | 2/2015 |
| WO | 2016049653 A1 | 3/2016 |
| WO | 2016146277 A1 | 9/2016 |

OTHER PUBLICATIONS

Search Report dated Feb. 2, 2018 in Geramn Application No. 102017111077.1 (Search Report cited to show evidence of relevance, no english translation).
Int'l Search Report and Written Opinion dated Jul. 27, 2018 in Int'l Application No. PCT/EP2018/063274, translation of ISR only.
FIA Formula E Championship Technical Regulations Reglement Technique du Championnat de Formule E de la FIA, https://www.fia.com/fia-formula-e-championship-technical-regulations-2016-2017, (2016-2017).
Office Action issued in German Application No. 11020180020635.3 dated Apr. 4, 2020 (no translation, shown for relevance).
Office Action dated Jun. 15, 2021 in German Application No. 11 2018 007 731.4 (no translation, only cited for relavance).
Examination Report dated Jun. 29, 2021 in GB Application No. 1919040.4.
Examination Report dated Aug. 6, 2021 in GB Application No. 2108691.3.
Office Action dated Mar. 4, 2022 in Britsh Application No. 1919040.4.

\* cited by examiner

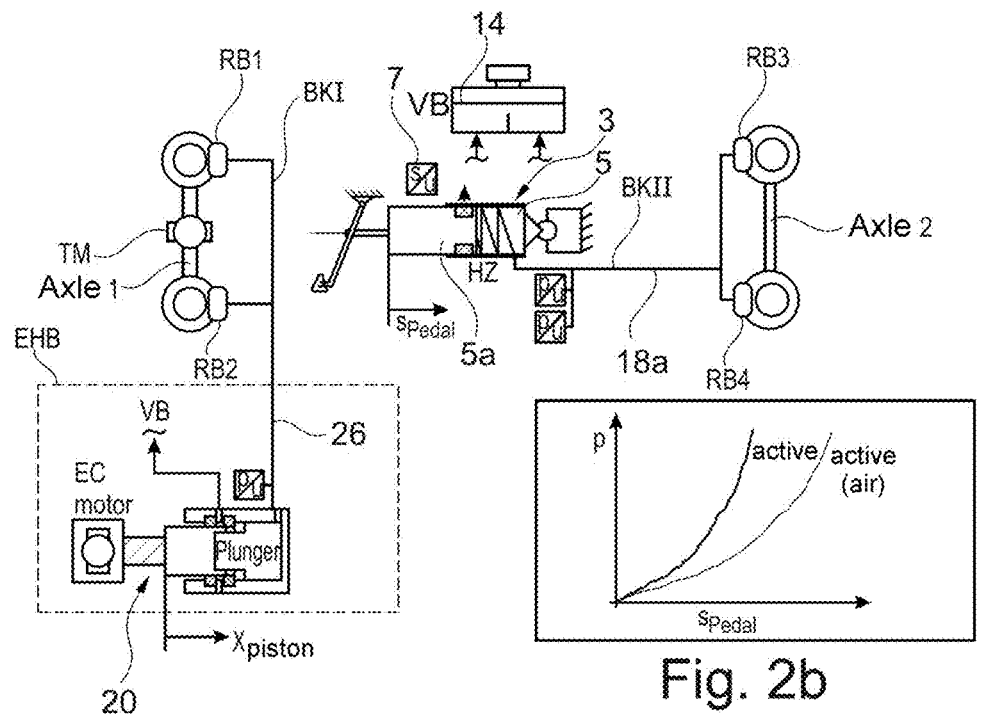
Fig. 2a
Fig. 2b
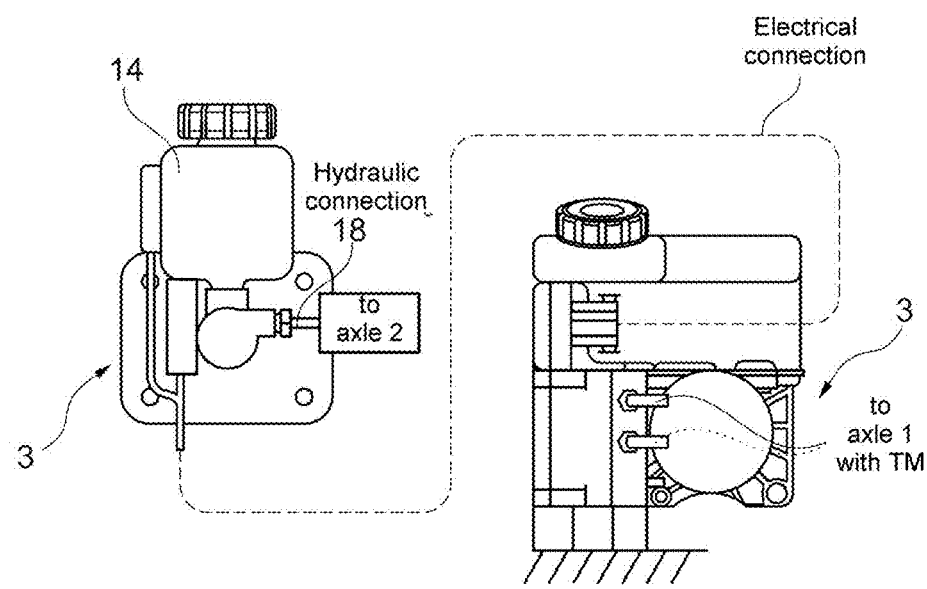
Fig. 2c

BRAKE DEVICE, IN PARTICULAR FOR ELECTRICALLY DRIVEN MOTOR VEHICLES

CROSS-REFERENCE TO RELATED APPLICATIONS

This application is a Section 371 U.S. National Stage Filing of International Application No. PCT/EP2018/063274, filed May 22, 2018, which was published in the German language on Nov. 29, 2018, under International Publication No. WO 2018/215397 A1, which claims priority to German Patent Application No. 10 2017 111 077.1, filed on May 22, 2017, the disclosures of which are incorporated herein by reference.

The invention relates to a brake apparatus or a brake system, in particular for electrically driven motor vehicles.

Such brake systems are already known, for example from EP 1 907 253 B1. In the case of said brake system, a first piston-cylinder unit is provided which is actuatable by means of an actuating device. Said actuating device has, on the one hand, a device or brake pedal that can be actuated by the driver, and a device that can be actuated by an electromotive drive. The two pressure chambers of the piston-cylinder unit are assigned to in each case one vehicle axle or one brake circuit and are connected to the wheel brakes via inlet/outlet valves assigned to the wheel brakes. Furthermore, said document has already disclosed solutions for a fall-back level and various concepts for pressure feedback control based on travel and electrical current.

DE 10 2005 055 751 has furthermore disclosed a brake system with pressure-volume control or pressure gradient control by means of the pressure-volume characteristic curve.

DE 10 2012 002 791 A1 has also disclosed a brake system, having a first piston-cylinder unit or master cylinder with an actuating device that is actuatable by the driver, and having a second piston-cylinder unit, which is driven by an electromotive actuating device. Here, by means of isolating valves provided in the hydraulic lines to the wheel brakes, the first piston-cylinder unit can be separated from the brake circuits, such that only the second piston-cylinder unit acts on the brake circuits.

One design solution of an electromotively driven piston-cylinder unit is known for example from PCT/EP2013/057609.

In said solution, the rotor of the motor is mounted unilaterally in the motor housing.

In automobile racing, aside from the Formula 1 championship, the Formula E championship, to which particular regulations and technical requirements apply, has existed since the year 2014. Said requirements place particular restrictions on developers and constructors and present them with new challenges; in particular, highly precise braking torque feedback control of traction motor and electrohydraulic brake is required.

The known brake systems have various disadvantages which make them appear unsuitable or non-optimal for use in motor racing, in particular in vehicles in the Formula E championship.

It is an object of the invention to create a brake system for vehicles which satisfies at least the prerequisites and conditions of Formula E vehicles, that is to say inter alia vehicles with a high-power traction motor (100-300 kW) at one axle, and, at the same time, to permit in particular highly precise braking feedback control and advantageous recuperation and optimized deceleration of the vehicle in accordance with demand.

Said object is achieved according to the invention with a brake system having the features of the various independent claims.

For this purpose, in a first axle, a pressure is generated in the master brake cylinder, which generates a braking torque, exclusively by means of the actuating force of the driver. In the second axle, it is the intention for feedback control of the braking torque to be performed through a combination of braking power of the traction motor and active pressure feedback control of an electrically driven piston-cylinder unit.

With the solution according to the invention or the embodiments thereof described below, an ideal recuperation and braking feedback control system for vehicles with a high-power electric motor (100-300 kW) is created. It is thus highly advantageously possible to implement innovative braking management, wherein a distribution of the braking action between the traction motor and the electromotively driven second piston-cylinder unit (EHB axle module) is realized.

It is expedient here for a setpoint pressure ($p_{setpoint}$) and the pressure change (dp/dt) to be adjusted through travel control of the piston of the second piston-cylinder unit. In accordance with the characteristic of the brake system, the pressure leads to a braking torque and a deceleration of the hydraulic system and a deceleration of the traction motor. The overall deceleration $a_{total}$ is determined as the sum of the deceleration of the EHB axle module $a_{EHB}$ and of the traction motor $a_{TM}$.

It is advantageously the case that, in the presence of low pressures, through decoupling, the braking is performed only by means of the traction motor, such that maximum recuperation is attained. In the fall-back level (RFE), in the event of failure of the second piston-cylinder unit, the braking is performed by means of the traction motor and the first piston-cylinder unit, in particular by means of two circuits or by means of one circuit. In the case of a one-circuit fall-back level (FIG. 2a), the traction motor is utilized in the fall-back level for deceleration at one axle.

Highly precise pressure feedback control in accordance with demand is performed by means of the second piston-cylinder unit (EHB axle module). Here, it is expedient for the pressure-volume characteristic curve (DVK) to be used for the travel control of the piston of the second piston-cylinder unit. It is thus possible to attain ideal pressure feedback control through fast attainment of the target pressure by pilot control by means of the pressure-volume characteristic curve and feedback control of the pressure change, such that an advantageous adjustment to the traction motor braking torque feedback control is realized.

A maximization of the pressure build-up dynamics is advantageously realized by assistance of the electric motor of the second piston-cylinder unit (EHB module) in the lower pressure range. In this way, a very fast onset of braking is possible, which is important in particular in emergency braking operations. Time-to-lock (TTL) values of <100 ms are thus achieved. The typical TTL time in classic systems in the passenger motor vehicle sector with 12 V is 150 ms. The dynamics are ultimately restricted by the chassis. Since these restrictions have less of a limiting effect during racing operation, shorter times can be implemented. Also, a braking system with 48 V may be used in order to further increase the dynamics. These advantages can expediently be utilized such that braking is performed later and the vehicle can thus be operated at maximum speed for longer, which has a significant influence on lap time. Also, modern intra-vehicle distance feedback control systems and emergency braking systems can be implemented in order to react quickly to braking operations of a vehicle travelling in front and avoid the risk of an accident. This is highly important in particular during races in urban areas.

The pressure gradient feedback control may advantageously also be used in the context of an optimized deceleration which is variable over time, in order to likewise optimize the lap time or for intelligent inter-vehicle distance feedback control, with which the burden on the driver is reduced, for example through active utilization of camera sensors and controlled braking processes in particular during cornering.

Since very precise and highly dynamic pressure feedback control and/or braking deceleration feedback control is highly advantageous for racing operation, various sensors and characteristic maps are evaluated in order to react very quickly to changes. This is based on highly dynamic and precise travel control of the piston.

Here, for the travel control of the piston, the pressure-volume characteristic curve of the wheel brake and the pressure at the axle or alternatively the pressure of the piston-cylinder unit of the EHB axle module is evaluated. The pressure-volume characteristic curve changes for example as a result of air in the hydraulic system. An ongoing adaptation is necessary for this purpose. For the adaptation, a pressure transducer is used in order to adapt a corresponding assignment of piston travel to pressure.

The piston position is expediently calculated by means of an angle encoder a of the electric motor. As a further sensor for optimum highly precise feedback control, the phase current i of the electric motor and the temperature T of the electric motor or of the piston-cylinder unit are evaluated. The phase current is utilized such that, by means of the torque constant kt that replicates the relationship between phase current and torque of the electric motor, a torque can be set which, owing to a constant cross section of the piston-cylinder unit, correlates with a pressure. For this purpose, the losses in the torque transmission (for example efficiency of the gearing, mechanical losses) must be known or determined. This may be performed by means of trimming using a pressure sensor. By means of the evaluation of the electrical current, it is possible, through intelligent pilot control, to very quickly adjust to a pressure that approximately corresponds to the desired target pressure, and the delay times of the inert pressure measurement by the pressure transducer are thus compensated, that is to say the pressure is adjusted to in a substantially exact manner by means of phase current feedback control and, after a time delay, is validated by means of the pressure encoder.

By means of the temperature sensor, changes in the hydraulic system (changes in viscosity in the fluid) and a change in the torque constant kt as a result of warming of the electric motor are determined.

By means of the temperature information, the viscosity in the hydraulic system, which varies owing to the influence of temperature, can be replicated and utilized for adapted travel control of the EHB axle module. This is highly significant in particular for the pressure gradient feedback control, because a different pressure difference must be set by the EHB axle module in order, in the case of varying viscosity, to attain the same pressure gradient by means of a greater throttling action. The reason for this is that the pressure gradient is determined by the pressure difference between EHB actuator and wheel brake and the throttling action.

The temperature may also be utilized in order to detect a change in the brake system (for example fading effect). In the case of fading, the braking action varies in a manner dependent on the set pressure as a result of warming of the wheel brake, that is to say, for a desired constant braking deceleration, a higher pressure must be set in the event of fading. This information can advantageously be utilized in order to create a characteristic map in order to optimize the dependency of the braking action in dependence on the pressure in the event of a variation of the brake system, for example owing to varying temperatures. This characteristic map can likewise be used in addition to the pressure-volume characteristic curve for highly exact braking feedback control under different conditions. This is of very great significance in particular in motor racing, because the temperatures vary highly dynamically during operation.

Further advantages of the invention and the embodiments thereof will emerge from the subclaims and the description of the exemplary embodiments.

Figure 1C:
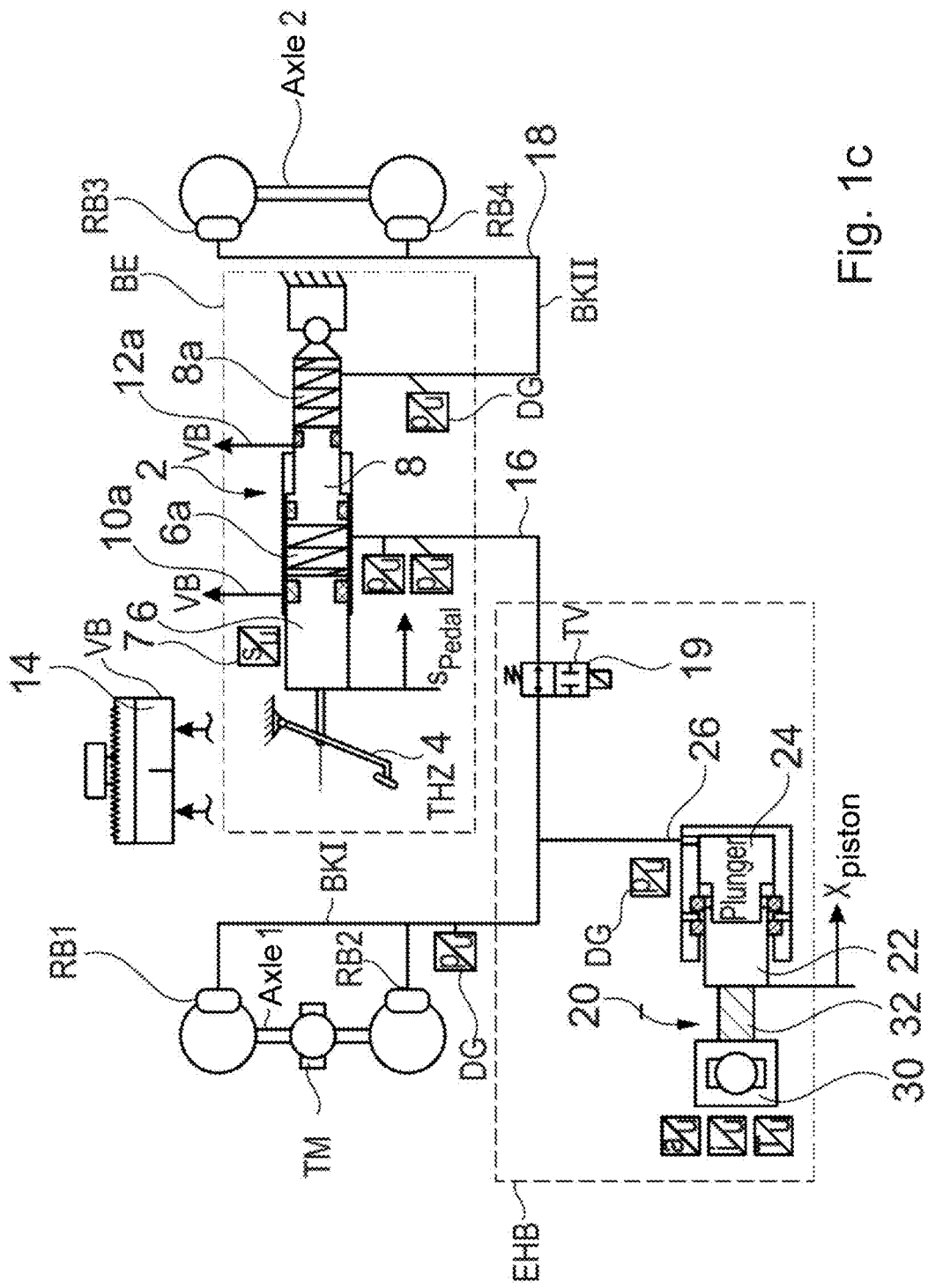
Figure 1D:
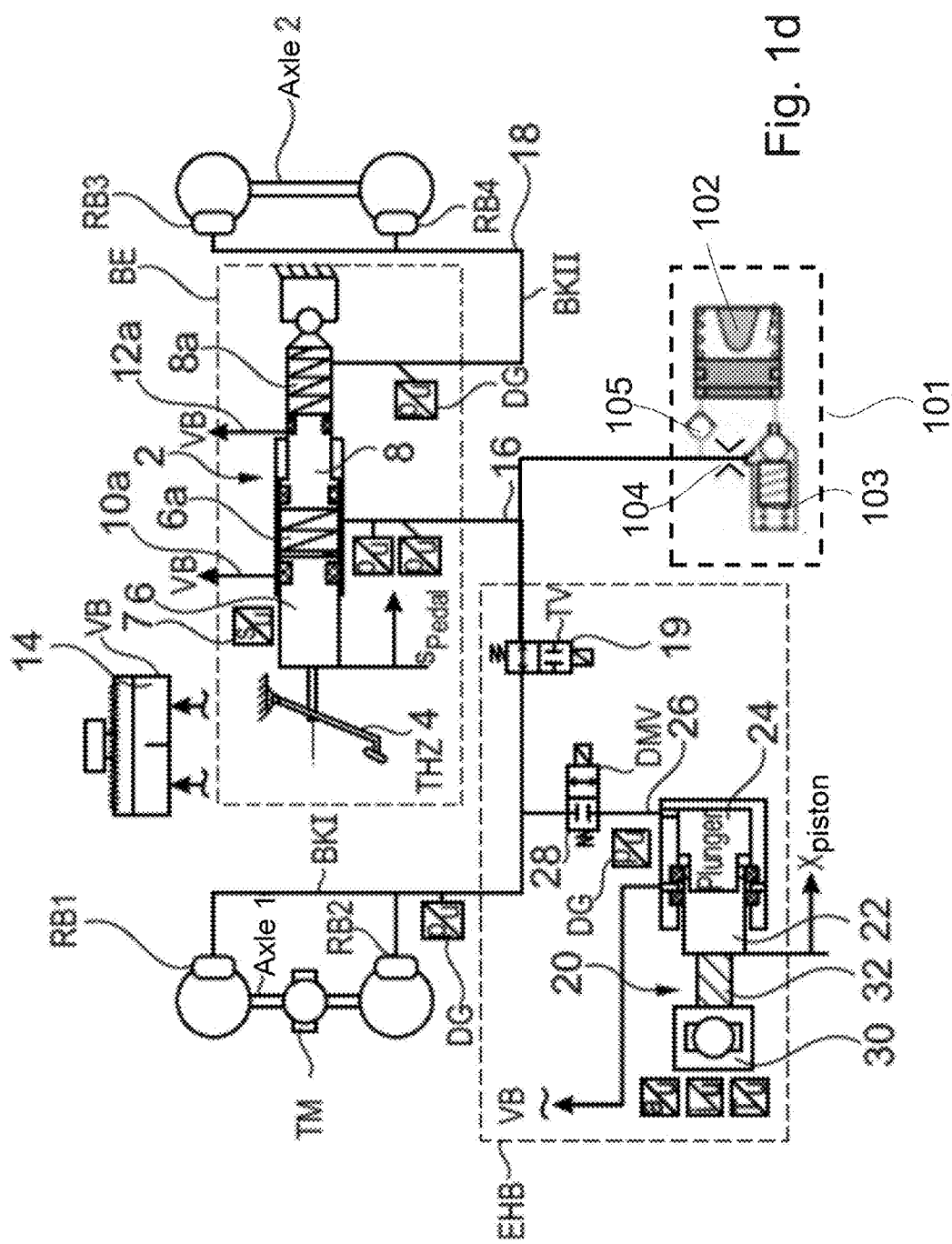
Figure 1E:
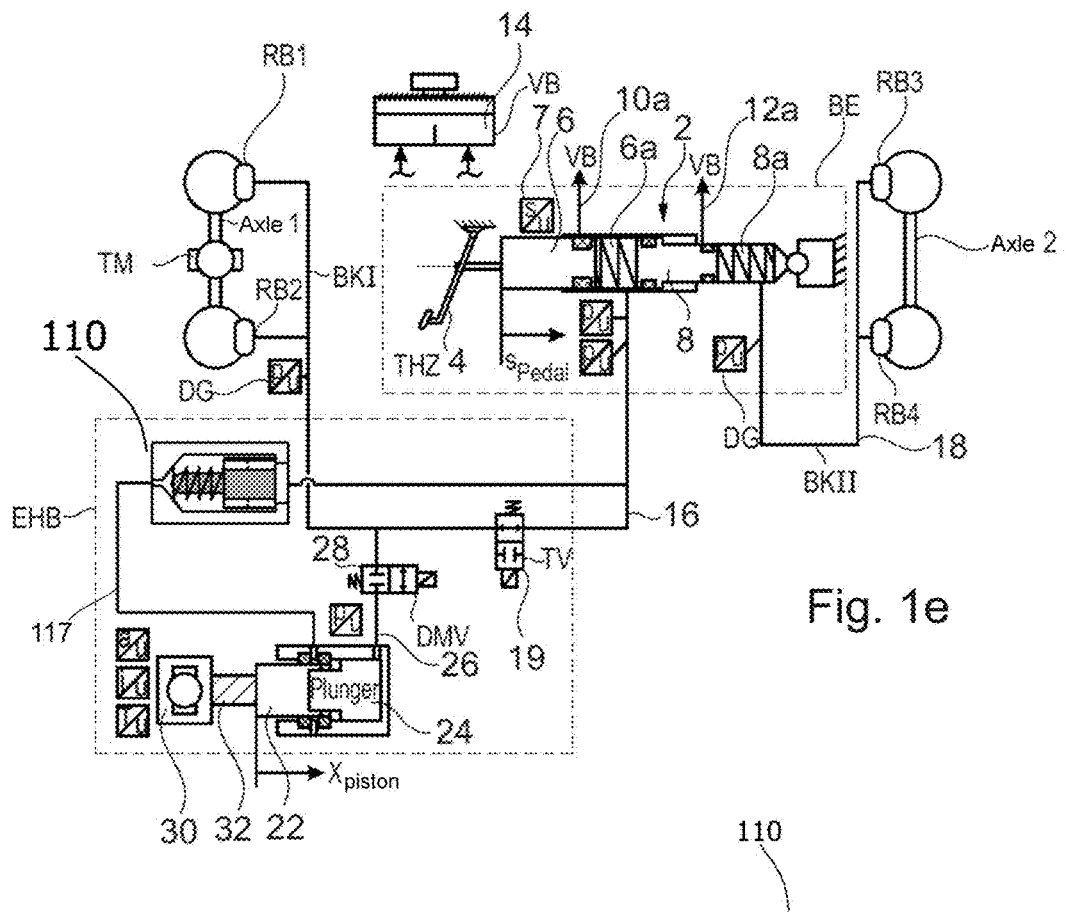
Figure 1F:
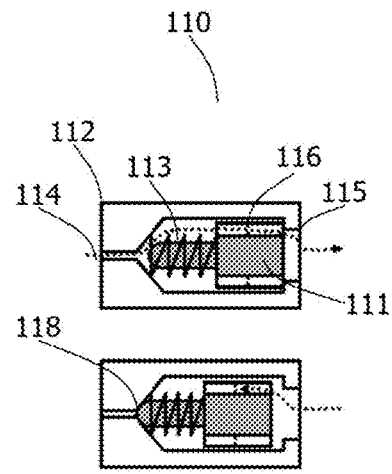
Figures 3A, 3B:
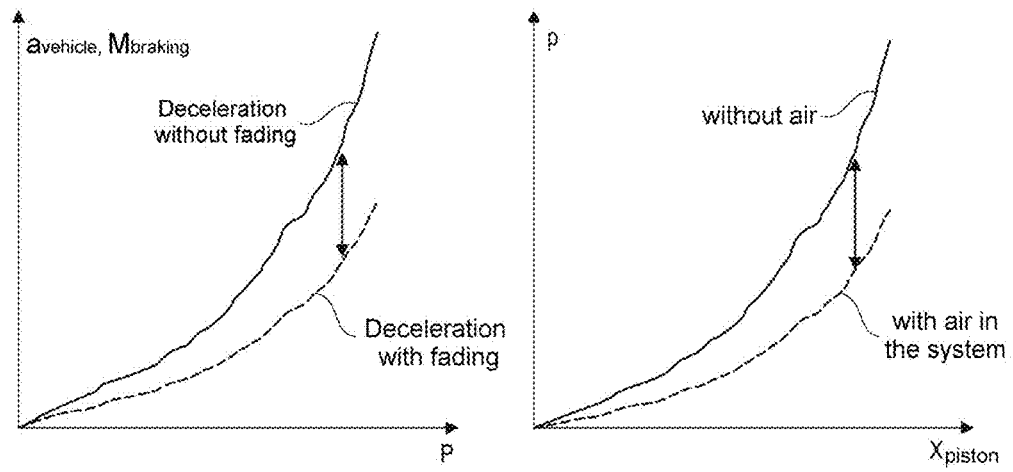
Figure 4A:
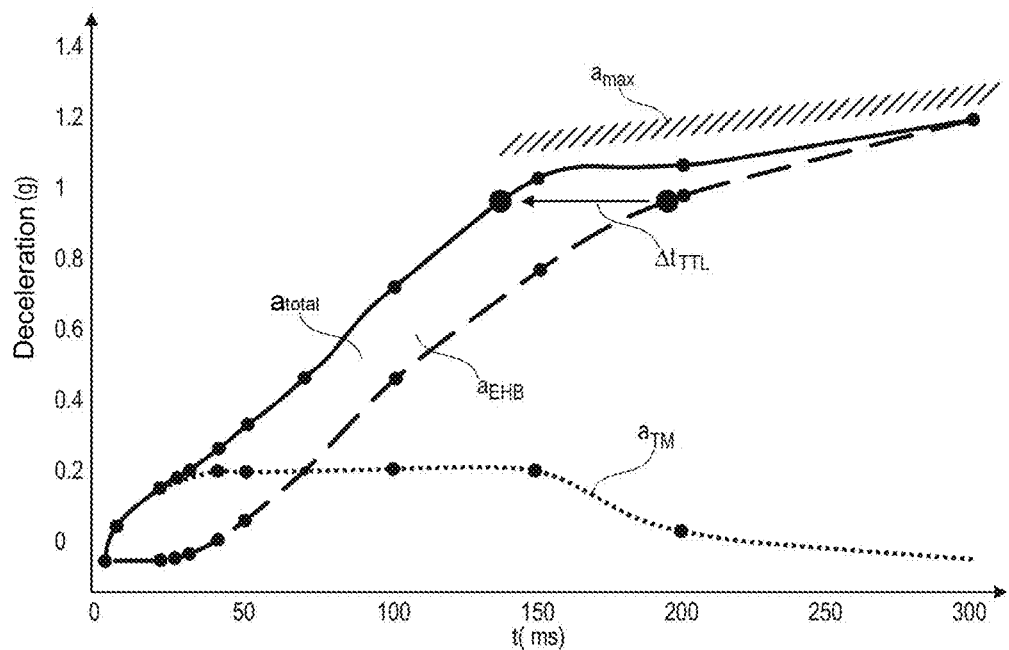
Figure 4B:
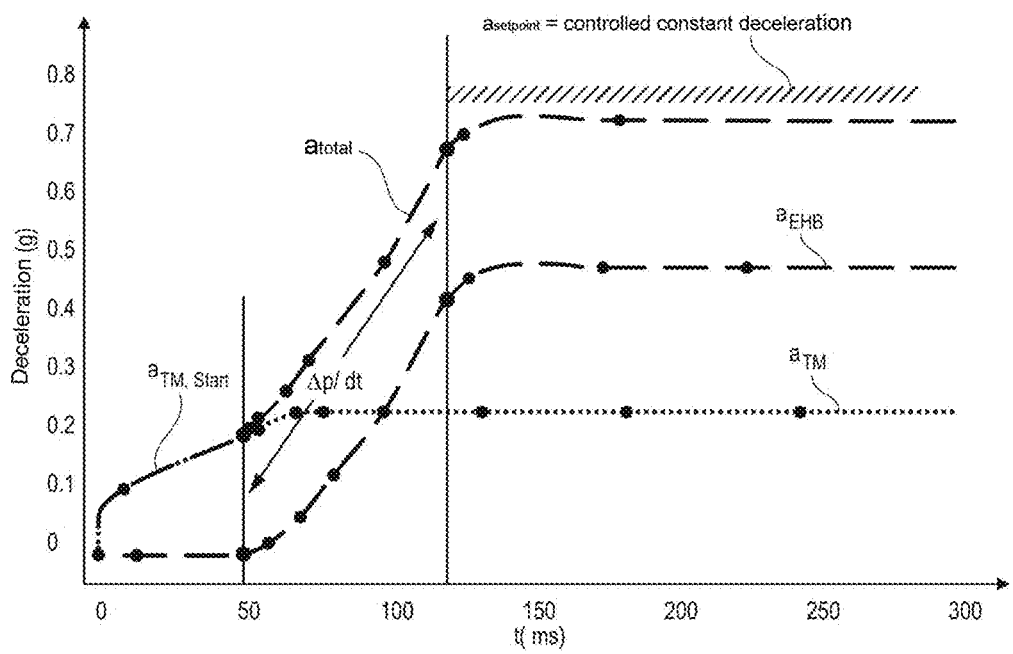
Figure 5:
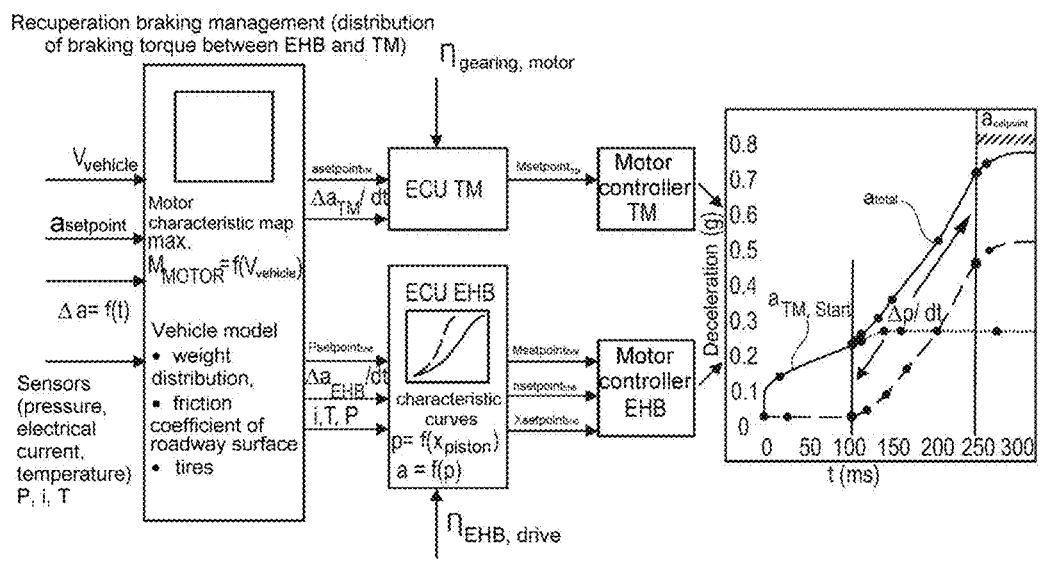
Figure 6:
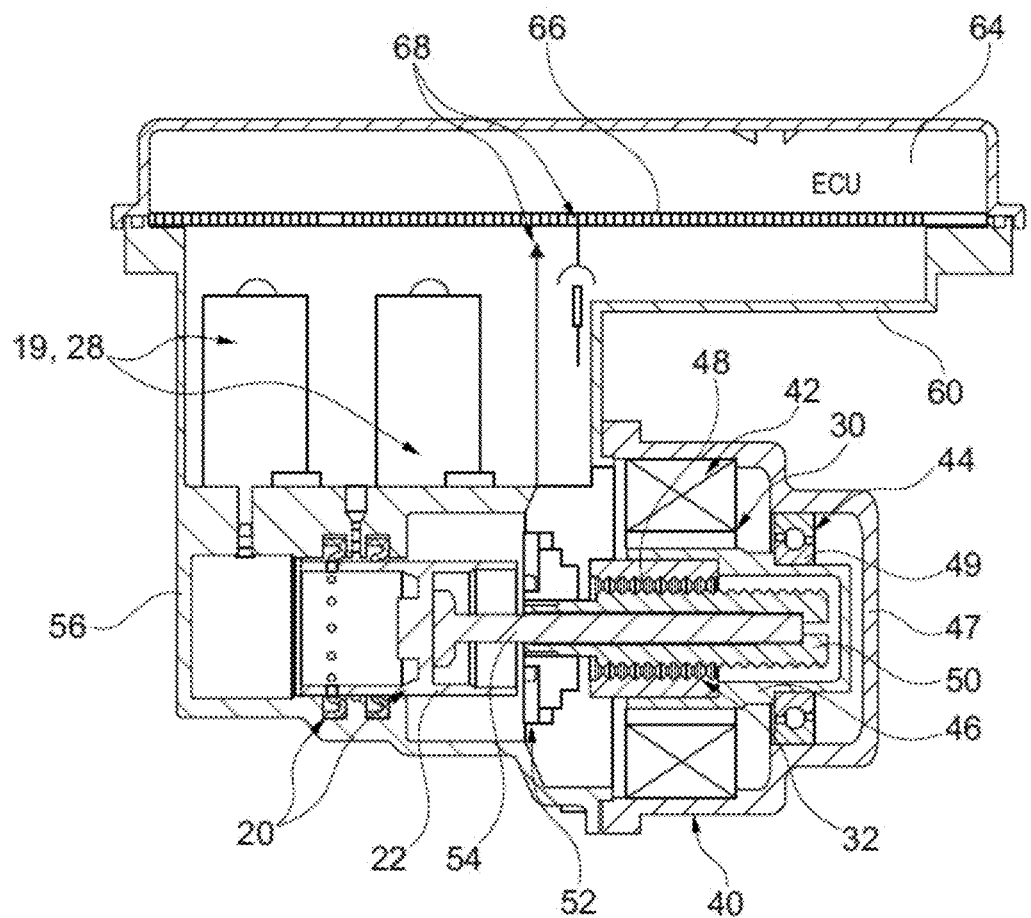

Advantageous exemplary embodiments of the invention and the embodiments thereof are illustrated in the drawing and described in more detail below. In the drawing:

FIG. 1a: schematically shows a brake system for a motor vehicle with high-power traction motor;

FIG. 1b: is an illustration of the pressure (force)-volume/travel dependency in the active mode (active) and in the fall-back level (RFE);

FIG. 1c: shows a further development of the brake system illustrated in FIG. 1a for the purposes of substantially optimizing the hydraulic cabling complexity and the system weight;

FIG. 1d: shows an embodiment with travel simulator unit;

FIG. 1e: shows a further development of the brake system illustrated in FIG. 1a, wherein the replenishment line has been omitted and a replenishment valve is arranged in place of the replenishment line;

FIG. 1f: shows a replenishment valve as per FIG. 1e;

FIG. 2a: schematically shows another embodiment of a brake system for a vehicle with high-power traction motor, wherein the first piston-cylinder unit acts exclusively only on the brakes of one brake circuit or of one vehicle axle;

FIG. 2b: is an illustration of the pressure (force)-volume/travel dependency in the active mode (active) and in the fall-back level (RFE) of the brake system as per FIG. 2a;

FIG. 2c: is an illustration of the first and second piston-cylinder units of the embodiment as per FIG. 2a with the associated hydraulic and electrical connecting lines;

FIG. 3a: shows a characteristic map of deceleration $a_{vehicle}$ and braking torque $M_{braking}$=f(pressure) in the case of fading as a result of intense warming of the wheel brake;

FIG. 3b: shows a characteristic map of pressure-volume characteristic curves=f(piston travel) in the case of air in the system;

FIG. 4a: is an illustration of a first operating strategy of the brake system according to the invention, with maximized deceleration;

FIG. 4b: is an illustration of a second operating strategy of the brake system according to the invention, with controlled deceleration;

FIG. 5: is an illustration of the braking management with distribution of the braking torques by means of ECU between the traction motor and the second piston-cylinder unit or the EHB module;

FIG. 6: shows a structural design of the EHB module, with a second piston-cylinder unit, electric motor, spindle drive, valves, sensors and ECU.

FIG. 1a schematically shows the rear axle HA and the front axle VA of a vehicle with wheels and wheel brakes RB1, RB2 (HA) and RB3, RB4 (VA) and with an electric vehicle traction motor TM with high power (>100 kW) and high torque at one axle, preferably, as illustrated, at the rear axle.

The brake system illustrated in FIG. 1a, which is however specifically designed not exclusively for Formula E applications, has a first piston-cylinder unit 2, which in this case has the function of a (brake) master cylinder and which is actuatable by means of an actuating device 4, in particular a brake pedal. The piston-cylinder unit 2 has two pistons 6, 8 and pressure chambers 6a, 8a assigned to these.

Here, the piston 8 is, as illustrated, expediently but not imperatively designed as a stepped piston. In this way, a different brake pressure distribution at the axles can be achieved through corresponding configuration of the stepped piston. The pressure chambers 6a, 8a are connected via hydraulic connecting lines 10a and 12a to a reservoir (VB) 14, and via hydraulic connecting lines 16, 18 to wheel brakes RB1 and RB2, and RB3 and RB4, respectively. The hydraulic connecting lines 16, 18 form brake circuits BK1 and BK2. An in particular normally-open isolating valve (TV) 19 is arranged in the hydraulic line 16 that leads from the pressure chamber 6a to the wheel brakes RB1, RB2 of the driven axle (in this case HA). No valve is arranged in the hydraulic line 18 that leads from the pressure chamber 8a to the wheel brakes of the non-driven axle in this case VA. In other words, in particular, in each case one working chamber of the first piston-cylinder unit is connected to the wheel brakes of a vehicle axle.

At the first piston-cylinder unit 2 and the hydraulic connecting lines, there are provided various sensors, in particular, as illustrated in the drawing, two pressure transducers at the line 16 upstream of the isolating valve 19 and a further one downstream of the isolating valve and downstream of an isolating valve (DMV) which is described further below and which is assigned to the second piston-cylinder unit, and a pressure transducer at the line 18 or BKI. The first piston-cylinder unit 2 forms a first structural or assembly unit BE together with the actuating device 4 and various sensors, in particular pressure transducers 5, 5a, 5b and a travel sensor 7.

A second piston-cylinder unit 20 is a constituent part of an electromotively driven system or electric plunger. The second piston-cylinder unit 20 has a (plunger) piston 22 which delimits a pressure chamber 24 which is connected via a hydraulic line 26 and an in particular normally-closed valve (DMV) 28 to one of the brake circuits BK1. Here, the connecting line 26 of the second piston-cylinder unit 20 opens into the brake circuit line downstream of the isolating valve (TV) 19 as viewed in a direction from the first piston-cylinder unit 2. A further hydraulic connecting line is connected to the reservoir (VB) 14, such that, in the retracted position of the piston 22, pressure medium can pass out of the reservoir 14 into the pressure chamber 24.

The electric plunger has an electromotive drive, with a highly dynamic electric motor 30 and a gearing 32, in particular spindle gearing.

Sensors, in particular pressure transducers, angle encoders, rotational speed encoders, are, as illustrated, assigned to the electric plunger and/or integrated into the corresponding separate unit.

The electric plunger with the above-described components (second piston-cylinder unit with drive and gearing, isolating valves, sensors) forms a separate second structural or assembly unit or pressure feedback control unit (bordered by a dashed line) for the pressure feedback control of the brake system.

FIG. 1b is an illustration of the pressure (force)-volume (travel) dependency in the active mode (active) and in the fall-back level (RFE). The first curve shows the profile in the case of an intact booster (active), a shallower second curve shows the profile in the case of an active booster (EHB) with functional impairment for example owing to an air inclusion, and the third, even shallower curve (RFE) shows the profile in the so-called fall-back level in the event of failure of the booster. Upon actuation of the actuating device 4 or of the brake pedal, pressure 2 is built up in the two pressure chambers 6a, 8a of the first piston-cylinder unit, which pressure is firstly transmitted via the line 16 and the isolating valve 19 to the wheel brakes RB1, RB2 of the driven rear axle and via the line 18 (without isolating valve) to the wheel brakes RB3, RB4 of the non-driven front axle. Independently of this, by means of the second piston-cylinder unit, by actuation of the electric motor controlled by an electronic control and feedback control unit ECU, a booster pressure can be dynamically built up and dissipated or modulated. Said booster pressure is transmitted via the line 26 and the isolating valve (DMV) 28 likewise to the brake circuit BKI. This may be performed independently of the pressure buildup by means of the first piston-cylinder unit 2 or in parallel therewith. The feedback control of the pressure in the brake circuit BKI is performed by means of the travel control of the piston 22 of the second piston-cylinder unit 20 by means of the electric motor 30, utilizing the sensors (pressure transducers, angle encoders) and the pressure-volume characteristic curve.

Here, pressure feedback control is performed by means of the EHB unit and the torque feedback control of the traction motor TM of the vehicle, which together determine the deceleration of the vehicle at the axle 1. The deceleration at the axle 2 is determined exclusively by the actuation force and the pressure, wherein, in the two-circuit embodiment, the pressure of the working chamber is transmitted via a floating piston, and the cross-sectional area of the second working chamber determines the pressure in the wheel brakes of the axle 2.

Here, the braking feedback control at the axle 1 does not have an effect on the pedal feel. This is determined exclusively by the hydraulic connection of the first piston-cylinder unit 2 to the wheel brakes of the axle 2.

Figure is shows a weight-optimized alternative to the schematic illustration of the brake system illustrated and described in FIG. 1a. Here, the connecting line between reservoir 14 and pressure chamber 24 is omitted. Furthermore, the isolating valve (DMV) 28 is omitted entirely. The main motivation for this is the weight saving of the line from the reservoir 14 to the piston-cylinder unit 20. Since, in this way, a volume compensation in the pressure chamber 24 in the electrically deenergized state is no longer ensured, the isolating valve (DMV) 28 must also be omitted. A volume compensation caused for example by a temperature variation or by knock-back at the wheel brakes RB1 or RB2 can thus be realized via the hydraulic line 26, the valve 19, the hydraulic line 16 and the pressure chamber 6a to the reservoir.

For the switch to the fall-back level, the omission of the isolating valve (DMV) entails the following:

I. Failure in the case of approximately equal pressure levels to the right and to the left of the isolating valve (TV):

By contrast to the system with isolating valve (DMV), the driver in this case experiences a finite pedal drop. A loss of volume in relation to the mechanical fall-back level does not occur.

II. Failure in the presence of high recuperation power, such that the pressure in the hydraulic line 16 is considerably higher than the pressure in the hydraulic line 26:

As in the system with isolating valve (DMV), the driver in this case experiences a finite pedal drop. A loss of volume in relation to the mechanical fall-back level does not occur here either.

III. Failure in the presence of high pressure boosting, such that the pressure in the hydraulic line 16 is considerably lower than the pressure in the hydraulic line 26:

By contrast to the system with isolating valve (DMV), the driver in this case, too, experiences a finite but greater pedal drop. A loss of volume in relation to the mechanical fall-back level does not occur.

Summary: The omission of the DMV does not result in any severe functional disadvantages.

The movable seals for the pressure chamber 24 can now be designed differently owing to the omission of the connecting line to the reservoir. The fade of the hitherto provided high-pressure and low-pressure seals fixed to the housing with closed snifter bore is possible as a first solution (as depicted in FIG. 1c). An alternative solution would be a single seal fixed to the housing in a wide variety of different technically known embodiments. In addition to this, there is also the possibility of a seal fixed to the piston, which has advantages in terms of the wear of the seal.

An embodiment as per FIG. 1c furthermore offers functional advantages. Firstly, owing to the modified construction without reservoir port, the seal closing travel is reduced. This increases the pressure feedback control dynamics in the low pressure range up to 10 bar. A second functional degree of freedom is described in DE 10 2008 051 316 A1. Through the use of a seal that can withstand negative pressure for the pressure chamber 24, it is now also possible to realize a so-called active retraction of the brake pads. This can, depending on the design of the wheel brakes, advantageously influence the energy consumption of the vehicle.

FIG. 1d shows a further embodiment of FIG. 1a with additional travel simulator unit 101. This may be mechanically integrated into the electrohydraulic brake EHB or installed as a separate module. The travel simulator unit 101 has the effect that the pedal travel to pedal force characteristic curve can be configured optimally during active operation. For example, it may be the case that, owing to the stiff hydraulic regions 6a and 16, the pedal travel is too short in relation to the respective pedal force. Then, the installation of a travel simulator unit 101 is necessary. Said travel simulator unit is composed of substantially 4 components, the piston travel simulator 102 for replicating the travel-pressure characteristic, the simulator shut-off valve (SiV) 103 for shutting off the piston travel simulator in the fall-back level, the throttle 104 for realizing optimum pedal damping, the check valve 105 for the purposes of bypassing the throttle and the SiV, and having no pedal damping, when the pedal is released. In motor sport, the throttle and check valve are preferably omitted for weight reasons. In certain configurations, it is also possible for the simulator shut-off valve to be omitted. This is possible only if the volume capacity of the piston travel simulator is very small in relation to the total volume capacity of the wheel brakes, and the design permits this.

FIG. 1e shows a further possible refinement of the brake system described in FIG. 1a, wherein the hydraulic pressure compensation between brake system EHB and the reservoir is such that no replenishment line is necessary. The overall weight is thus reduced significantly, which is a considerable advantage specifically in motor sport.

The brake system EHB must, in the non-actuated state, be connected directly or indirectly to the reservoir in order that no positive pressure or negative pressure can form in the pressure chamber 24, and pad wear in the wheel brakes RB1 and RB2 can be compensated.

By contrast to the construction described in FIG. 1a, it is the case here that the direct hydraulic connection between the brake system EHB and the reservoir VB is severed and replaced by an indirect connection via the replenishment valve 110, the line 16, the chamber 6a and the connecting line 10a.

The connecting valve 110 is designed so as to be open in the non-actuated state and so as to automatically close if pressure is built up in the pressure chamber 6a. Thus, in the non-actuated state, there is an indirect connection between the pressure chamber 24 and reservoir VB.

FIG. 1f illustrates the specific construction of the replenishment valve 110 and the 2 possible switching positions.

The valve plunger 111 is guided in the valve housing 112 and, in the non-actuated state, is pushed by a valve spring 113 into the position in which the two valve ports 114 and 115 are connected to one another.

The valve plunger additionally has a bore with an orifice 116. As soon as pressure is built up in the pressure chamber 6a and thus also in the connecting line 16, a back pressure forms in the orifice 116, which back pressure pushes the valve plunger 111, counter to the spring 113, into the valve seat 118. The valve ports 114 and 115 are thus hydraulically separated.

FIG. 2a schematically shows another embodiment of a brake system for a vehicle with high-power traction motor, wherein the first piston-cylinder unit acts exclusively only on the brakes of one brake circuit or of one vehicle axle.

In this embodiment, the first piston-cylinder unit 3 has a pressure chamber 5 which is connected via a hydraulic connecting line 7 (BKII) to the wheel brakes RB3, RB4 of an axle 2. Two pressure transducers are arranged at the line 18a. The movement of the single piston 5a can be sensed by means of a pedal travel encoder 7 (not illustrated in any more detail).

The second piston-cylinder unit 20 is connected via a hydraulic connecting line 26 (BKI) to the wheel brakes RB1, RB2 of an axle 1 which is driven by the traction motor TM. A pressure transducer is provided at the connecting line 26.

FIG. 2c is an illustration of the first and second piston-cylinder units of the embodiment as per FIG. 2a with the associated hydraulic and electrical connecting lines.

The brake circuits BKI for the driven axle and BKII for the non-driven axle are, in this embodiment, completely separated from one another with regard to the actuating devices, that is to say first piston-cylinder unit and second piston-cylinder unit (EHB). The pedal feel is, as in FIG. 1a, determined by the pressure-volume characteristic of the wheel brakes of the axle 2 and the cross-sectional area of the first piston-cylinder system, which is hydraulically connected to the first piston-cylinder unit.

FIG. 2b is an illustration of the pressure (force)-volume (travel) dependency in the active mode (active) and in the fall-back level (RFE). The first curve shows the profile in the case of an intact booster (active), and a shallower second curve shows the profile in the case of an active booster with functional impairment for example owing to an air inclusion.

FIG. 2c shows, in another illustration, the structural or assembly units of a brake system as per FIG. 2a. Here, a first structural or assembly unit has the first piston-cylinder unit 3 with the actuating device (not illustrated here). The reservoir 14 is fastened to this. A hydraulic connecting line leads from the first structural or assembly unit to the non-driven axle 2 of the vehicle. An electrical connection leads from the first unit to the ECU of the second unit (EHB).

The second unit comprises the second piston-cylinder unit 20 with the valves and the electronic control and feedback control unit (ECU). Hydraulic connections lead from the second structural or assembly unit to that axle 1 of the vehicle which is driven by means of traction motor TM, and to the reservoir 14.

FIG. 3a shows illustrations of the relationship of the vehicle deceleration $a_{vehicle}$ or braking torque $M_{braking}$ on the pressure p, which may vary in the hydraulic brake as a result of warming or wear of the brake system. For example, in the event of fading, the braking action deteriorates for example owing to a high temperature in the brake system, that is to say the pressure must be increased in order to realize a desired constant braking action. This results in a steeper curve $M_{braking}=f(p)$ without fading or a shallower curve (shown by dashed lines) with fading. For targeted feedback control of the deceleration, it is therefore important to detect and evaluate the relationship between braking torque and pressure and store said relationship in a characteristic map in the memory of the ECU.

FIG. 3b is an illustration of the pressure p as a function of the piston travel $x_{piston}$ (pressure-volume characteristic curve or pressure-travel characteristic curve), wherein the relatively steep curve shows the pressure without air in the system and the relatively shallow curve shows the pressure with air in the system. For exact feedback control of the pressure as a function of the piston travel, it is therefore important to detect variations in the brake system and adjust the feedback control to these. It is therefore important to adaptively perform trimming of the pressure-volume characteristic curve and/or to utilize a characteristic map, which is evaluated. For this purpose, it may suffice to only evaluate pressures in particular positions (for example phase with constant pressure) in order, from this, to evaluate the relevant pressure-volume characteristic curve of the characteristic map.

FIG. 4a illustrates a first operating strategy of a brake system according to the invention. Here, a maximum deceleration is sought. Highly dynamic pressure generation up to the maximum deceleration $a_{max}$ is performed here by means of the traction motor TM and the EHB or second piston-cylinder unit 20. Here, $a_{total}$ is determined from the sum of the values $a_{TM}$ and $a_{EHB}$. The value of $a_{max}$ is in this case variable and can take into consideration a fading situation, for example. With regard to further details, reference is made directly to FIG. 5.

FIG. 4b shows a second operating strategy, wherein effective recuperation by means of the traction motor TM is sought. The feedback control $\Delta p/dt$ and the controlled deceleration with $a_{setpoint}$ are influential variables which are particularly important for motor sport. In the initial range, deceleration is performed with maximum recuperation by means of the traction motor $a_{TM}$. In the middle range, a steep increase of $a_{total}$ ($\Delta p/dt$) occurs, and a controlled deceleration with $a_{setpoint}$ is performed in the subsequent range.

FIG. 5 shows, in principle, the braking management of a brake system with high-power electric motor TM and electrohydraulic brake system EHB. There, the setpoint deceleration $a_{setpoint}$ is divided between traction motor TM and hydraulic brake EHB in accordance with the objective of the braking process (maximum recuperation, maximum deceleration, controlled deceleration). In this context, restrictions such as maximum torque of the traction motor are taken into consideration in a manner dependent on the vehicle speed or motor rotational speed, and a vehicle model is used which replicates weight distribution, friction coefficient of the roadway and tires and which predefines further restrictions.

A setpoint deceleration $a_{setpoint,TM}$ and advantageously also the profile of the deceleration Da/dt are transmitted to the ECU of the traction motor. In the ECU, taking into consideration the efficiency of the motor and gearing, a setpoint torque $M_{setpoint}$ is transmitted to the motor controller.

At the same time, a setpoint torque $p_{setpoint,EHB}$, a pressure gradient $Dp_{EHB}/dt$ and the temperature T are transmitted to the ECU of the EHB. From these variables, and after evaluation of the characteristic maps $p=f(x_{piston})$ and $a=f(p)$ recorded in the ECU, setpoint torque $M_{setpoint,EHB}$, setpoint rotational speed $n_{setpoint,EHB}$ and setpoint position $x_{setpoint,EHB}$ are transmitted to the motor controller and partially or entirely used in the feedback control, wherein the focus is on the position feedback control of the piston, and the characteristic maps are used inter alia in order to adjust the setpoint pressure to variations of the wheel brake, for example variations in the braking action in the presence of predefined pressures in the event of fading. Pressure transducers in the system are then used in the outermost feedback control loop only for readjustment, owing to the inertia of the measurement. The aim is that of achieving the most precise possible pilot control or, with corresponding model accuracy, omitting the pressure transducer as a feedback control variable. The pressure transducer is therefore, aside from the readjustment, used primarily for the characteristic map recording or parameterization and variations of parameters in the brake system. The very small time constants of an electric motor and the high accuracy of the current measurement and angle encoders in relation to pressure transducers are used for highly dynamic feedback control. Viscosities in the hydraulic system furthermore lead to delay times in the pressure measurement, which are furthermore not constant in the event of temperature changes.

FIG. 6 illustrates a structural embodiment of the EHB module, in the case of which the components or structural units of the EHB module are constructed and combined in a particularly advantageous compact design. As already described, the EHB module forms a separate structural unit. This has substantially the electric motor 30, the spindle gearing 32, the second piston-cylinder unit 20 and the associated sensors.

Here, the electric motor has a motor housing 40 in which an outer stator 42 is mounted. A rotor 46 is arranged in the stator by means of an in particular unilateral bearing arrangement with only one bearing 44. For the unilateral bearing arrangement, a 4-point bearing is advantageously used which, in an axial direction, is seated substantially in the region of the radially extending housing wall, in particular, as illustrated, in an axial projection 47 of the motor housing. The inner ring 49 of the bearing is seated on the outer circumference of the rotor 46. Further details regarding the unilateral bearing arrangement emerge from PCT/

EP2013/057609, to which reference is made here in this respect. A nut 48 is arranged in the front part of the rotor 46 in the interior of the rotor. Said nut is a constituent part of a ball screw drive, which includes a spindle 50 arranged in the nut 48, which spindle is equipped with a rotation prevention means 52 such that a rotation of the nut 48 results in an axial displacement of the spindle 50. Seated centrally in the spindle 50 is a plunger 54 which extends out of the spindle 50 in the direction of the plunger piston. By way of its front end, the plunger 54 is connected by means of a connecting device to the piston 22, such that, in the event of movement of the spindle in both directions, said piston is driven along by the spindle 50.

The piston 22 of the second piston-cylinder unit 20 is arranged in a corresponding bore of a housing 56. Said housing 56 also entirely or partially receives, in a recess 58, the isolating valves and the corresponding hydraulic connecting lines. The longitudinal axes of the isolating valves 19, 28 in this case run substantially perpendicular to the longitudinal axis of the second piston-cylinder unit 20. In the upper part of the housing 56, that is to say the part averted from the second piston-cylinder unit, said housing has a lateral extension 60 in order to create sufficient space for the arrangement of an electronic control and feedback control unit (ECU) 64. The contacting of the valve coils with the ECU 64 is realized by means of corresponding devices 68 in the region of the circuit board 66. The motor housing 40 is attached, in particular by screw connection, to the housing 56 laterally, or below the housing extension 60.

REFERENCE DESIGNATIONS

2 First piston-cylinder unit (FIG. 1a)
4 Actuating apparatus, in particular brake pedal
3 First piston-cylinder unit (FIG. 2a)
5 Pressure chamber
5a Piston
6 Piston
6a Pressure chamber
7 Travel sensor
8 Piston
8a Pressure chamber
10a Connecting line
12a Connecting line
14 Reservoir (VB)
16a Connecting line
18a Connecting line
19 Isolating valve (TR)
20 Second piston-cylinder unit
22 (Plunger) piston
24 Pressure chamber
26 Connecting line
28 Isolating valve (DMV)
30 Electric motor
32 Gearing
40 Motor housing
42 Stator
44 Bearing
46 Rotor
47 Axial projection
48 Nut
49 Inner ring
50 Spindle
52 Rotation prevention means
54 Plunger
56 Housing
58 Recess
60 Housing extension
64 Control and feedback control unit (ECU)
66 Circuit board
68 Contact device
70 Motor housing
72 Outer stator
74 Rotor
76 Piston
78 Piston-cylinder unit
80 Recess
82 Recess
84 Flexural rod
86 Spindle
88 Nut
92 Bore
94 Housing cover
96 Rotation prevention means
100 Electronic control and feedback control unit (ECU)
101 Travel simulator unit
102 Piston travel simulator
103 Simulator shut-off valve (SiV)
104 Throttle
105 Check valve
110 Replenishment valve
111 Valve plunger
112 Valve housing
113 Valve spring
114 Valve port
115 Valve port
116 Bore with orifice
117 Replenishment port
h Efficiency
p Pressure
x Travel
M Torque
a Deceleration
n Rotational speed
T Temperature
$V_{vehicle}$ Vehicle speed

What is claimed is:

1. A brake apparatus for an electrically driven motor vehicle with a first and a second axle, including:
   a traction motor at the first axle of the vehicle, which traction motor is configured for use both as a drive motor and as a brake system with recuperation of brake energy,
   a first piston-cylinder unit, which is actuatable by means of an actuating device, the first piston-cylinder unit either having a first piston separating a first pressure chamber, or having a first piston separating a first pressure chamber and a second piston separating a second pressure chamber,
   a second piston-cylinder unit, which is actuatable by means of an electromotive drive and a non-hydraulic gearing apparatus, the second piston-cylinder unit having exactly one pressure chamber,
   wherein at least one of the first piston-cylinder unit or the second piston-cylinder unit is connected via hydraulic connecting lines to a first wheel brake and a second wheel brake of the first axle and a third wheel brake and a fourth wheel brake of a second axle of the motor vehicle,
   wherein the first pressure chamber, or at least one of the first pressure chamber or the second pressure chamber, of the first piston-cylinder unit is connected to two wheel brakes of one of the first axle or the second axle, without separate wheel brake valves for each of the two wheel brakes, such that the same pressure is applied to each of the two wheel brakes, wherein a pressure chamber of the second piston-cylinder unit is connected to the first wheel brake and the second wheel brake of the first axle for active brake force feedback control and recuperation control in interaction with the traction motor, and wherein a travel simulator is hydraulically connected to at least one of the pressure chambers of the first piston-cylinder unit.

2. The brake apparatus as claimed in claim 1,
wherein:
the first piston-cylinder unit is combined with the actuating device and a first associated sensor in a first structural or assembly unit, the associated sensor comprising at least one of a travel sensor or a pressure sensor, and
the second piston-cylinder unit is combined with the electromotive drive, the non-hydraulic gearing apparatus, and a second associated sensor in a second structural or assembly unit separate from the first structural or assembly unit, the second associated sensor comprising at least one of a current sensor, an angular sensor, a temperature sensor, or a pressure sensor.

3. The brake apparatus as claimed in claim 1, further including an electronic control and feedback control device configured to distribute braking torques at the first wheel brake and the second wheel brake of the first axle between the traction motor and the second piston-cylinder unit.

4. The brake apparatus as claimed in claim 1, wherein pressure metering in accordance with demand is performed by means of the second piston-cylinder unit, wherein control of the pressure metering is performed by means of travel control or combined travel and pressure control of a piston of the second piston-cylinder unit through utilization of a pressure-volume characteristic curve.

5. The brake apparatus as claimed in claim 4, wherein the pressure-volume characteristic curve is adaptively adjusted after every braking operation.

6. The brake apparatus as claimed in claim 4, wherein, by means of a characteristic map, variation of a relationship between brake pressure and deceleration is, utilizing temperatures of the wheel brakes, utilized for refined brake force feedback control.

7. The brake apparatus as claimed in claim 4, wherein the apparatus is adapted to measure and to control a pressure change gradient established by the second piston-cylinder unit.

8. The brake apparatus as claimed in claim 1, wherein the recuperation is maximized by means of intermittent braking by means of the traction motor only.

9. The brake apparatus as claimed in claim 2, the second structural or assembly unit including:
a first, normally open, isolating valve connected into a connecting line from the first piston-cylinder unit to the first and second wheel brakes of the first axle, and/or
a second, normally closed, isolating valve connected into a connecting line from the second piston-cylinder unit to the first and second wheel brakes of the first axle, wherein the first isolating valve is connected into a connecting line from the second piston-cylinder unit to the first and second wheel brakes of the first axle.

10. The brake apparatus as claimed in claim 1, wherein the third wheel brake and the fourth wheel brake of the second vehicle axle are actuatable only by means of the first piston-cylinder unit.

11. The brake apparatus as claimed in claim 1, wherein only the third wheel brake and the fourth wheel brake of the second vehicle axle are actuatable by means of the first piston-cylinder unit.

12. The brake apparatus as claimed in claim 1, wherein no replenishment line is provided between the second piston-cylinder unit and a reservoir, and wherein pressure compensation between the second piston-cylinder unit and the reservoir occurs indirectly via the first piston-cylinder unit.

13. The brake apparatus as claimed in claim 1, wherein a replenishment port of the second piston-cylinder unit is connectable by means of a valve to a hydraulic line connected to the first piston-cylinder unit.

14. The brake apparatus as claimed in claim 13, wherein the valve is designed to automatically close if a pressure at a first port of the valve is higher than a pressure at a second port of the valve.

15. The brake apparatus as claimed in claim 1, wherein the pressure chamber of the second piston-cylinder unit is connected permanently, without an interposed valve, to a hydraulic line of a first brake circuit.

16. A motor vehicle comprising the braking apparatus according to claim 2, wherein the first axle of the vehicle is a rear axle.

17. The brake apparatus as claimed in claim 1, wherein the traction motor has a power of 100 kW or more.

18. A brake apparatus for electrically driven motor vehicles with axles, having
a traction motor at a first axle, which traction motor is used as a brake system with recuperation of brake energy,
a first piston-cylinder unit comprising a first piston and a first pressure chamber, the first piston-cylinder unit being actuatable by means of an actuating device,
a second piston-cylinder unit which has exactly one pressure chamber and which is actuatable by means of an electromotive drive and a non-hydraulic gearing apparatus,
wherein the first piston-cylinder unit and the second piston-cylinder unit are connected via hydraulic connecting lines, without wheel valves, to wheel brakes of the motor vehicle, such that the wheel brakes of at least one of the first axle or a second axle are charged with the same pressure during a braking operation,
wherein the pressure chamber of the second piston-cylinder unit is connected to the wheel brakes of the first axle for active brake force feedback control and recuperation control in interaction with the traction motor,
wherein the first pressure chamber of the first piston-cylinder unit is hydraulically connected via only one normally open valve to the wheel brakes of the first axle, such that, in the event of a failure of the second piston-cylinder unit, the first piston-cylinder unit generates pressure in the wheel brakes of the first axle to operate in combination with a torque of the traction motor to decelerate the vehicle.

19. The brake apparatus as claimed in claim 18, wherein the traction motor has a power of 100 kW or more.

20. The brake apparatus as claimed in claim 18, wherein:
the first piston-cylinder unit is combined with the actuating device and a first associated sensor in a first structural or assembly unit, the associated sensor comprising at least one of a travel sensor or a pressure sensor, and
the second piston-cylinder unit is combined with the electromotive drive, the non-hydraulic gearing apparatus, and a second associated sensor in a second structural or assembly unit separate from the first structural or assembly unit, the second associated sensor comprising at least one of a current sensor, an angular sensor, a temperature sensor, or a pressure sensor.

21. The brake apparatus as claimed in claim 18, further including an electronic control and feedback control device configured to distribute braking torques at the first wheel brake and the second wheel brake of the first axle between the traction motor and the second piston-cylinder unit.

22. The brake apparatus as claimed in claim 18, wherein pressure metering in accordance with demand is performed by means of the second piston-cylinder unit, wherein control of the pressure metering is performed by means of travel control or combined travel and pressure control of a piston of the second piston-cylinder unit through utilization of a pressure-volume characteristic curve.

23. The brake apparatus as claimed in claim 22, wherein the pressure-volume characteristic curve is adaptively adjusted after every braking operation.

24. The brake apparatus as claimed in claim 22, wherein, by means of a characteristic map, variation of a relationship between brake pressure and deceleration is, utilizing temperatures of the wheel brakes, utilized for refined brake force feedback control.

25. The brake apparatus as claimed in claim 22, wherein the apparatus is adapted to measure and to control a pressure change gradient established by the second piston-cylinder unit.

26. The brake apparatus as claimed in claim 18, wherein the recuperation is maximized by means of intermittent braking by means of the traction motor only.

27. The brake apparatus as claimed in claim 18, the second structural or assembly unit including:
a normally closed isolating valve connected into a connecting line from the second piston-cylinder unit to the first and second wheel brakes of the first axle.

28. The brake apparatus as claimed in claim 18, wherein the third wheel brake and the fourth wheel brake of the second vehicle axle are actuatable only by means of the first piston-cylinder unit.

29. The brake apparatus as claimed in claim 18, wherein no replenishment line is provided between the second piston-cylinder unit and a reservoir, and wherein pressure compensation between the second piston-cylinder unit and the reservoir occurs indirectly via the first piston-cylinder unit.

30. The brake apparatus as claimed in claim 18, wherein a replenishment port of the second piston-cylinder unit is connectable by means of a valve to a hydraulic line connected to the first piston-cylinder unit.

31. The brake apparatus as claimed in claim 30, wherein the valve is designed to automatically close if a pressure at a first port of the valve is higher than a pressure at a second port of the valve.

32. The brake apparatus as claimed in claim 18, wherein the pressure chamber of the second piston-cylinder unit is connected permanently, without an interposed valve, to a hydraulic line of a first brake circuit.

33. A motor vehicle comprising the braking apparatus according to claim 18, wherein the first axle of the vehicle is a rear axle.

34. The brake apparatus as claimed in claim 18, further including:
a travel simulator hydraulically connected, or hydraulically connectable, by means of an electric switching valve, to a hydraulic connecting line of one brake circuit, and
a hydraulic throttle arranged in the hydraulic connecting line to the travel simulator.

\* \* \* \* \*